United States Patent
Ishida et al.

(10) Patent No.: US 11,378,760 B2
(45) Date of Patent: Jul. 5, 2022

(54) CONNECTOR ASSEMBLY ARRANGEMENT

(71) Applicant: Hirose Electric Co., Ltd., Yokohama (JP)

(72) Inventors: Naruki Ishida, Yokohama (JP); Masayuki Goto, Yokohama (JP); Yoshiaki Sano, Yokohama (JP)

(73) Assignee: Hirose Electric Co., Ltd., Yokohama (JP)

( * ) Notice: Subject to any disclaimer, the term of this patent is extended or adjusted under 35 U.S.C. 154(b) by 0 days.

(21) Appl. No.: 16/983,546

(22) Filed: Aug. 3, 2020

(65) Prior Publication Data
US 2021/0033798 A1 Feb. 4, 2021

(30) Foreign Application Priority Data

Aug. 2, 2019 (JP) .............................. JP2019-143017

(51) Int. Cl.
*G02B 6/38* (2006.01)
*H01R 12/70* (2011.01)

(52) U.S. Cl.
CPC ......... *G02B 6/389* (2013.01); *H01R 12/7082* (2013.01)

(58) Field of Classification Search
CPC ... G02B 6/4284; G02B 6/389; H01R 12/7082
See application file for complete search history.

(56) References Cited

U.S. PATENT DOCUMENTS

| | | | | |
|---|---|---|---|---|
| 8,588,562 B2* | 11/2013 | Zbinden | ............... | G02B 6/4249 385/14 |
| 8,961,039 B2* | 2/2015 | Sano | ...................... | G02B 6/428 385/89 |
| 2002/0114141 A1* | 8/2002 | Medina | ................ | G02B 6/4261 361/728 |
| 2006/0270283 A1* | 11/2006 | Kumazawa | .......... | G02B 6/3897 439/676 |
| 2013/0148973 A1 | 6/2013 | Zbinden et al. | | |

FOREIGN PATENT DOCUMENTS

JP 2013-544447 A 12/2013

* cited by examiner

*Primary Examiner* — Sung H Pak
(74) *Attorney, Agent, or Firm* — Procopio, Cory, Hargreaves & Savitch LLP

(57) ABSTRACT

A connector assembly arrangement comprising, disposed on the faces of a circuit board in an electronic device, connector assemblies which, along with having a plug connector that incorporates a photoelectric conversion element capable of converting optical signals and electrical signals from one to the other and a receptacle connector with which said plug connector is mated, have the plug connector and the receptacle connector electrically connected through mutual contact between terminals; wherein the plug connector, from which a fiber optic cable for optical signal transmission that is connected to the photoelectric conversion element extends in one direction from said plug connector, also has terminals connected to the above-mentioned photoelectric conversion element; the fiber optic cable is a single fiber optic cable; and a plurality of connector assemblies are disposed on at least one of the two faces of the circuit board.

3 Claims, 12 Drawing Sheets

CONNECTOR ASSEMBLY ARRANGEMENT

CROSS-REFERENCE TO RELATED APPLICATIONS

This application claims priority to Japanese Patent Application No. 2019-143017, filed Aug. 2, 2019, the contents of which are incorporated herein by reference in its entirety for all purposes.

TECHNICAL FIELD

The present invention relates to a connector assembly arrangement, which comprises connector assemblies having a plug connector that incorporates a photoelectric conversion element and a receptacle connector it mates with, and in which a fiber optic cable used for measurement and the like is connected to the plug connector.

RELATED ART

In various areas there exist electronic devices in which measurement, observation, or the like is performed using a fiber optic cable and optical signals are converted to electrical signals to perform analysis.

A camera, etc., used for measurement is connected to one end of the fiber optic cable, and its other end is connected through connector assemblies to a signal processing unit in the electronic device. The connector assemblies normally have a plug connector and a receptacle connector as its mating counterpart, a photoelectric conversion element that converts optical signals and electrical signals from one to the other is incorporated into said plug connector, and a fiber optic cable is connected to said photoelectric conversion element.

In such an electronic device, measurements are sometimes conducted simultaneously in multiple locations. In the past, when multiple fiber optic cables corresponding to each of these multiple locations were connected to an electronic device, a universal connector assembly comprising a universal plug connector and a universal receptacle connector corresponding thereto was sometimes used, in which all the optical signals coming from the multiple fiber optic cables were received and converted to electrical signals using a plug connector provided in a single connector assembly. Such a universal connector assembly, which is a unitary body, is disposed on the face of a circuit board in the electronic device, and is connected to a signal processing unit.

SUMMARY

Problems to be Solved

If multiple fiber optic cables are connected to a processor or another signal processing unit in an electronic device, the electronic device can be made more compact by disposing the above-described universal connector assembly, which has multiple fiber optic cables connected thereto, in a single location instead of disposing single connector assemblies, each having one fiber optic cable connected thereto ("single connector assemblies" below), in multiple locations on the circuit board.

However, while it is usually desirable for a connector to be usable in a variety of electronic devices, the above-mentioned universal connector assembly is itself a unitary body and, therefore, once the number of the fiber optic cables to be connected is determined and the device is manufactured, this number cannot be changed even if the conditions of use change. While it is quite natural that the number of the fiber optic cables cannot be increased, a reduction in their number results in unused sections in the universal connector assembly and the dimensions of the connector assembly become excessively large for the conditions of use, which requires design modifications. This means that there must be a variety of universal connector assemblies provided with different numbers of connected fiber optic cables, which is not economical.

Further, depending on the electronic device, it may also be desirable to position the locations of connection to the connector assembly with multiple fiber optic cables in a distributed manner and arrange the connector assembly consistent with the configuration of the interior space of the electronic device. However, with a universal connector assembly, these requirements cannot be met.

In view of such circumstances, it is an object of the present invention to provide a connector assembly arrangement that makes it possible to handle any number of fiber optic cables and affords flexibility in selecting locations for connector assembly arrangement. There is a need to provide a connector assembly arrangement that makes it possible to handle any number of fiber optic cables and affords flexibility in selecting locations for connector assembly arrangement.

Technical Solution

The inventive connector assembly arrangement is structured to involve, disposed on the faces of a circuit board in an electronic device, connector assemblies which, along with having a plug connector that incorporates a photoelectric conversion element capable of converting optical signals and electrical signals from one to the other and a receptacle connector with which said plug connector is mated, have the plug connector and the receptacle connector electrically connected through mutual contact between terminals.

Such a connector assembly arrangement according to the present invention is characterized by the fact that the plug connector, from which a fiber optic cable for optical signal transmission that is connected to the above-mentioned photoelectric conversion element extends in one direction from said plug connector, also has terminals connected to the above-mentioned photoelectric conversion element; the above-mentioned fiber optic cable is a single fiber optic cable; and a plurality of connector assemblies are disposed on at least one of the two faces of the above-mentioned circuit board.

Because in the thus-configured present invention a single connector assembly is formed by connecting a single fiber optic cable to the plug connector and mating it with the receptacle connector, even if multiple single connector assemblies are disposed on at least one face of the circuit board in the electronic device, the number of the single connector assemblies can be freely changed and their arrangement locations can be freely selected, which makes optimal design possible for various electronic devices.

In the present invention, a plurality of the above-mentioned connector assemblies can be disposed on one face of the above-mentioned circuit board and one or multiple assemblies can be disposed on the other face. In addition to ensuring that the number of the single connector assemblies can be freely changed and their arrangement locations can be freely selected, placing a plurality of connector assemblies on one face of the circuit board and one or multiple assemblies on the other face makes it possible for both faces of the circuit board to be used in an efficient manner.

In the present invention, the above-mentioned connector assemblies can be disposed on one face of the above-mentioned circuit board and on the other face thereof in a staggered manner when viewed in the direction in which the above-mentioned fiber optic cable protrudes. Placing the single connector assemblies on both faces of the circuit board such that they are disposed in a staggered manner when viewed in the direction in which the fiber optic cable protrudes facilitates wiring the connector assemblies to the signal processing unit under the best mode scenario in terms of ambient conditions.

Technical Effect

Because the connector assemblies which, along with having a plug connector that incorporates a photoelectric conversion element capable of converting optical signals and electrical signals from one to the other and a receptacle connector with which said plug connector is mated, have the plug connector and the receptacle connector electrically connected through mutual contact between terminals, are disposed on the faces of the circuit board in the electronic device, and because the plug connector, from which a fiber optic cable for optical signal transmission that is connected to the above-mentioned photoelectric conversion element extends in one direction from said plug connector, also has terminals connected to the above-mentioned photoelectric conversion element, and the above-mentioned fiber optic cable is a single fiber optic cable, and a plurality of connector assemblies are disposed on at least one of the two faces of the above-mentioned circuit board, when multiple single fiber optic cables are connected to the signal processing unit in the electronic device through the connector assemblies, the number of the multiple connector assemblies disposed on at least one face of the circuit board can be freely changed and their arrangement locations can be freely selected, which makes optimal design possible for the arrangement of the connector assemblies in the electronic device.

BRIEF DESCRIPTION OF DRAWINGS

FIGS. 1(A) and 1(B) illustrate a perspective view illustrating a state in which connector assemblies representing an embodiment of the present invention are provided in each of a signal processing portion contained in an electronic device and measurement portions extending from said electronic device, wherein FIG. 1(A) is a perspective view, and FIG. 1(B) is a lateral view.

FIGS. 2(A) and 2(B) illustrate perspective views illustrating a single connector assembly of FIGS. 1(A) and 1(B), wherein FIG. 2(A) is a state before mating the plug connector with the receptacle connector, and FIG. 2(B) is a state is after mating.

FIGS. 4(A) and 4(B) illustrate vertical cross-sectional views of the plug connector of FIG. 3, wherein FIG. 4(A) illustrates the plug connector in its entirety, and FIG. 4(B) is an enlarged view of one portion thereof.

FIGS. 6(A) and 6(B) are illustration of the procedure used to mate the plug connector with the receptacle connector, wherein FIG. 6(A) illustrates only the plug connector with a vertical cross-section taken in the vicinity of a lateral edge of the plug connector and shows the receptacle connector with a lateral view in a state when, prior to mating, the plug connector is in a tilted orientation, and FIG. 6(B) is a vertical cross-sectional view taken in the vicinity of a lateral edge of the plug connector at the start of fitting when only the front end portion of the plug connector has been fitted in.

FIGS. 8(A) and 8(B) illustrate vertical cross-sectional views of the front end portion taken in a plane extending in the forward-backward direction in a state in which the plug connector has been mated with the receptacle connector, wherein FIG. 8(A) is a vertical cross-sectional view taken in the vicinity of a lateral edge of the plug connector in the connector width direction, and FIG. 8(B) is a vertical cross-sectional view taken at the location of the end terminal in the connector width direction.

DETAILED DESCRIPTION

Figures 1A, 1B:
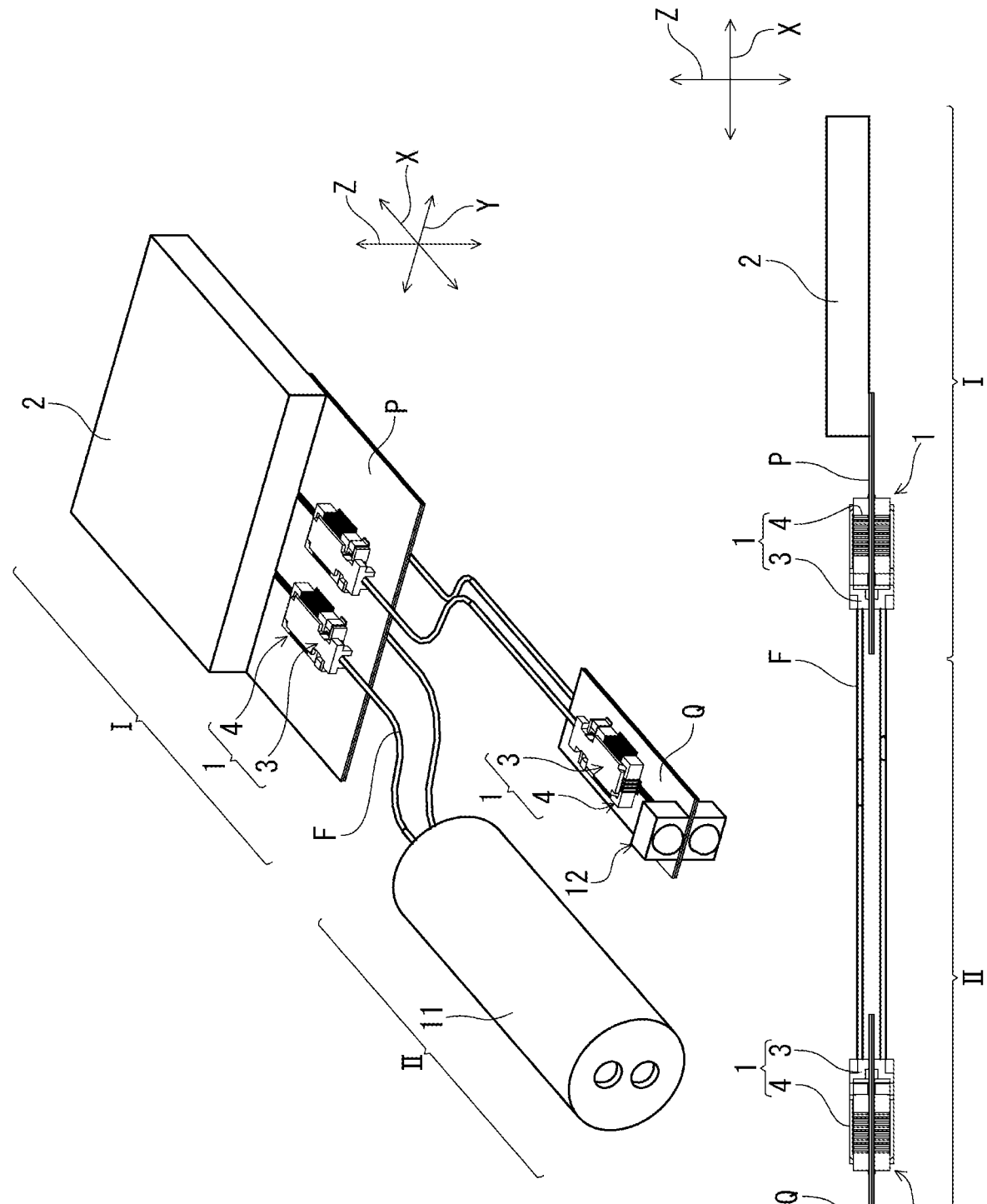
Figure 2A:
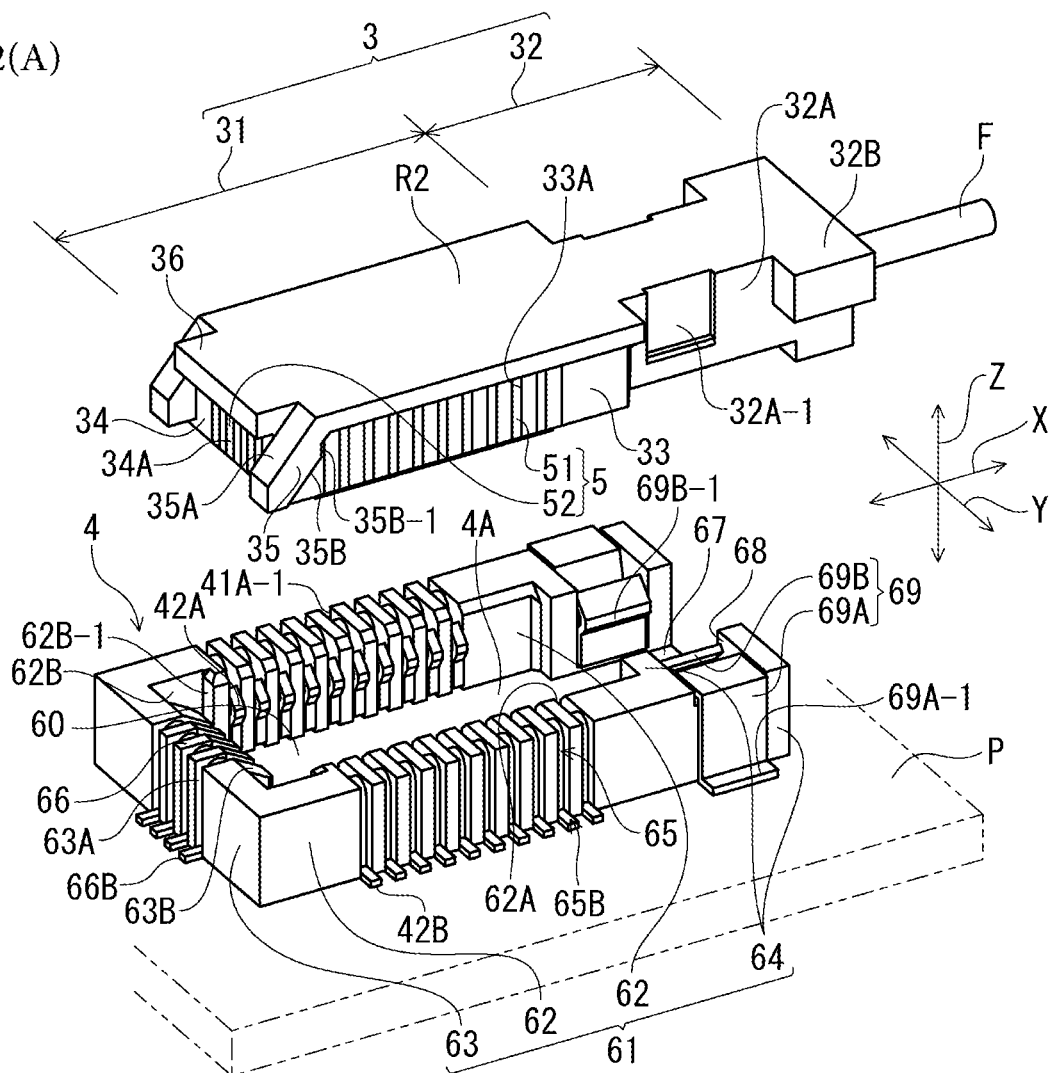
Figure 2B:
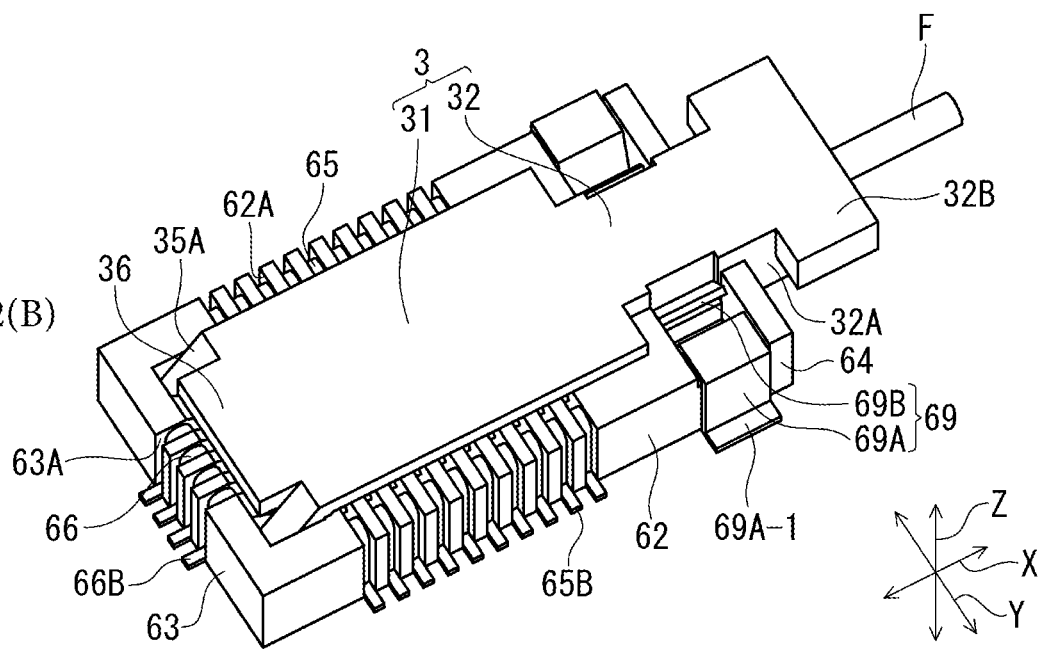

FIG. 1(A) is a perspective view illustrating a state in which connector assemblies representing an embodiment of the present invention are provided in each of a signal processing portion contained in an electronic device (not shown) and measurement portions extending from said electronic device, and FIG. 2(B) is a side view thereof.

FIG. 1(A) and FIG. 1(B) illustrate a signal processing portion I contained in an electronic device and measurement portions II extending from said electronic device. Said electronic device and the measurement portions II are used to form, for example, an endoscope system in which case the electronic device constitutes the main body portion of the endoscope system and the measurement portions II constitute an endoscope.

The signal processing portion I, which is adapted to convert optical signals received from the measurement portions II via fiber optic cables F to electronic signals and process them, has disposed on circuit board P a plurality of connector assemblies 1 used for optical signal reception and conversion to electrical signals, and a processor 2, which serves as a signal processing unit that processes electrical signals obtained from the connector assemblies 1.

In the example illustrated in FIG. 1(A), two assemblies are disposed on the top face of circuit board P and two are disposed on its bottom face (the lower connector assemblies are obscured by the circuit board P in FIG. 1(A) and not shown, but are shown in FIG. 1(B)). The above-mentioned connector assemblies 1 have a plug connector 3, to which a fiber optic cable F is connected, and a receptacle connector 4, to which said plug connector 3 is matingly connected. The plug connector 3 and the receptacle connector 4 will be described in detail below.

The fiber optic cable F, whose front end side is connected to the rear end side of the plug connector 3, is a single, single-fiber, fiber optic cable. In addition, a single connector assembly 1 is formed by the plug connector 3, to which this single fiber optic cable is connected, and the receptacle connector 4, to which said plug connector 3 is matingly connected. In the present embodiment, disposing the connector assemblies 1 on both faces of circuit board P provides freedom in making changes to the number of, and in selecting placement locations for, the single connector assemblies 1, thereby making it possible to efficiently utilize both faces of the circuit board.

As can be seen in FIG. 1(A) and FIG. 1(B), the measurement portions II, which extend from the signal processing portion I, have cameras 12 serving as measurement elements and connector assemblies that are completely identical to the above-described connector assemblies 1 disposed, as relay elements, on a circuit board Q inside a flexible guard 11 (therefore, in FIG. 1(A) and FIG. 1(B), the connector assemblies on circuit board Q are also shown as connector assemblies 1). In the present embodiment, as shown in FIG. 1(A), there are provided two measurement portions II, however the illustration of one flexible guard 11 has been omitted in the drawing such that the internal cameras 12, connector assemblies 1, and circuit board Q are shown exposed (in FIG. 1(B), the illustration of the flexible guards 11 has been omitted).

In FIG. 1(A) and FIG. 1(B), the cameras 12 are disposed on each of the top and bottom faces of circuit board Q inside each flexible guard 11 in the measurement portion II and aiming the distal end of one flexible guard 11 at the site of measurement makes it possible to perform imaging using the two cameras 12. The upper and lower cameras 12 are connected respectively to the upper and lower connector assemblies 1 and the fiber optic cables F extending from the upper and lower connector assemblies 1 are connected respectively to the upper and lower connector assemblies 1 on circuit board P in the signal processing portion I.

Optical signals obtained by imaging with the cameras 12 are changed into electrical signals in the cameras 12 and said electrical signals are sent to the plug connectors 3 through the receptacle connectors 4 of the connector assemblies 1 on circuit board Q. The above-mentioned electrical signals are converted to optical signals by photoelectric conversion elements in the plug connectors 3 and these optical signals are sent via the fiber optic cables F to the connector assemblies 1 on circuit board P of the signal processing portion I.

The aforementioned connector assemblies 1 used in the signal processing portion I and the measurement portions II will be described next. Connector assemblies 1 of exactly the same configuration are used both in the signal processing portion I and in the measurement portions II, with the only difference between the two being the direction of signal conversion. In the former, optical signals are converted to electrical signals, whereas electrical signals are converted to optical signals in the latter. Since there isn't any substantial difference in their configurations, the discussion herein will thus focus on the connector assemblies 1 in the signal processing portion I.

As can be seen in FIG. 2(A) and FIG. 2(B), the plug connector 3 and receptacle connector 4 constituting the connector assemblies 1 are adapted to be matingly connected in the direction of mating Z, which is a direction perpendicular to the surface of circuit board P. In FIG. 2(A) and FIG. 2(B), the plug connector 3 is mated with the receptacle connector 4 from above and is removed therefrom in the upward direction. FIG. 2(A) illustrates a state before mating and FIG. 2(B) illustrates a state after mating.

As can be seen in FIG. 2(A), the fiber optic cable F of the plug connector 3 is connected in the forward-backward direction X that is parallel to the surface of circuit board P and perpendicular to the above-mentioned mating direction Z so as to extend from the rear end side of said plug connector 3. The dimensions of the front half 31 of the plug connector 3 in the connector width direction Y (direction perpendicular to both the forward-backward direction X and the mating direction Z) are formed to be larger than those of the rear half 32.

Terminals 5 are arranged in the front half 31 so as to be exposed on the exterior peripheral surface of the front half 31. Specifically, in each of a pair of lateral edge portions 33 located so as to be opposed in the connector width direction Y and extending in the forward-backward direction X, there are arranged lateral terminals 51, which are exposed on the exterior lateral faces of said lateral edge portions 33, and, in the front end edge portion 34 that extends in the connector width direction Y, there are arranged end terminals 52, which are exposed on the exterior lateral face of said front end edge portion 34. Inclined protrusions 35 are formed in the corner portions where the lateral edge portions 33 and the front end edge portion 34 intersect. These inclined protrusions 35, which protrude from the exterior lateral faces of the lateral edge portions 33 and from the front end face of the front end edge portion 34, have inclined top faces 35A and inclined bottom faces 35B that are downwardly tilted from back to front. The inclined top faces 35A and inclined bottom faces 35B are in substantially parallel planes. Restricted portions 35A-1, which extend a short distance perpendicularly to the mounting surface of circuit board P, that is, in the mating direction Z, are formed in the sections below the lower ends of the inclined top faces 35A, and restricted portions 35B-1, which extend a short distance in the mating direction Z, are formed in the sections above the upper ends of the inclined bottom faces 35B. Said restricted portions 35B-1 abut the restricting portions of the hereinafter-described receptacle connector 4, thereby restricting rearward movement in the forward-backward direction X. A forwardly protruding front tab 36 that extends in the connector width direction Y is provided in the upper front end portion of the front half 31 of the plug connector 3.

The rear half 32 of the plug connector 3 has formed therein recesses 32A, whose width dimensions are made smaller than those of the front half 31 in the connector width direction Y, and protruding portions 32B, whose width dimensions are made the same as those of the front half 31, are provided rearwardly of these recesses 32A. Shallow engagement grooves 32A-1, which extend all the way to the upper ends of the recesses and approach the vicinity of their lower ends, are formed in the recesses 32A.

The interior of this plug connector 3 will be described further after the following discussion of the receptacle connector 4 provided hereinbelow.

The receptacle connector 4, with which the above-described plug connector 3 is mated from above, has a receiving recess portion 4A for receiving the plug connector 3 that is formed by a perimeter wall 61 and a bottom wall 60, and the perimeter wall 61 has a pair of lateral walls 62, a front end wall 63, and rear end walls 64. The interior surface of the perimeter wall 61 forming the receiving recess portion 4A is formed to a shape and dimensions suitable for receiving the front half 31 of the plug connector 3 from above.

Terminal grooves 62A are formed in the lateral walls 62, and attached thereto are resilient lateral terminals 65 (hereinafter referred to simply as "lateral terminals 65"), which are placed in contact with the lateral terminals 51 of the plug connector 3. Resiliently deformable contact portions 65A protruding on the interior surface side of the lateral walls 62 are provided in said lateral terminals 65 so as to protrude from the interior surface of the lateral walls 62, and connecting portions 65B bent in an L-shaped configuration are provided on the exterior surface side of the lateral walls 62 at the lower end of the lateral walls 62 in contact with the surface of circuit board P.

The lateral walls 62 have lead-in recesses 62B formed on the interior surface between the front end wall 63 and the ranges of the lateral terminals 65 (in other words, between the front end wall 63 and the lateral terminals 65 located in the forward-most position). Said lead-in recesses 62B are formed as upwardly open recesses on the interior surface of the lateral walls 62 and serve as spaces into which the inclined protrusions 35 of the plug connector 3 are introduced from above. On the rear wall surface of said lead-in recesses 62B, there are formed restricting portions 62B-1 which, by abutting the restricted portions 35B-1 of the inclined protrusions 35, restrict the rearward movement of the plug connector 3 to which a biasing force is applied by the contact portions 66A of the hereinafter-described end terminals 66. Specifically, said restricting portions 62B-1 are adapted to provide a limiting value for the distance of relative displacement of the plug connector 3 under the action of the above-mentioned biasing force relative to the receptacle connector 4 in the direction of the biasing force (rearward).

Terminal grooves 63A, which are similar to the terminal grooves 62A in the lateral walls 62, are formed in the front end wall 63, and resilient end terminals 66 (hereinafter referred to simply as "end terminals 66"), which are similar to the lateral terminals 65, are attached to said terminal grooves 63A. In the same manner as the lateral terminals 65, these end terminals 66 also have resilient contact portions 66A provided on the interior surface side of the front end wall 63 (in FIG. 2(A) said contact portions 66A are located on the interior surface side of the front end wall 63 and not shown), and connecting portions 66B are provided on the exterior surface side of the front end wall 63. When the plug connector 3 is mated with the receptacle connector 4, said end terminals 66 serve as resilient members whose contact portions 66A are held in resilient contact with the end terminals 52 of the plug connector 3, and said contact portions 66A apply a rearwardly directed biasing force to the plug connector 3. If the end terminals 66 are not required, the resilient members can be implemented not as end terminals having resilient contact portions, but as resilient members of a different type.

In the present embodiment, as previously discussed, in the plug connector 3, lateral terminals 51 are arranged in the lateral edge portions and end terminals 52 are arranged in the front end edge portion. In addition, in the receptacle connector 4, lateral terminals 65 are arranged on the lateral walls 62 and end terminals 66 are arranged on the front end wall 63. Therefore, in comparison with the prior-art connector assemblies provided only with lateral terminals, the number of terminals can be increased in exact proportion to the number of end terminals without increasing connector dimensions.

In addition, since the end terminals 66 are arranged on the front end wall 63 of the receptacle connector 4, circuitry S used to electrically connect said end terminals 66 and the processor 2 may be formed on the mounting surface of circuit board P in the forward-backward direction X towards the processor 2 (see FIG. 9), and said circuitry S can be formed in a simple shape by keeping it short and straight.

The front end wall 63 has an increasing wall thickness throughout the array range of the end terminals 66 extending in the connector width direction Y, and its upper inner edge has formed thereon inclined face portions 63B that slope inwardly and downwardly. When the plug connector 3 that has been mated with the receptacle connector 4 is removed by tilting so as to raise the rear end side (side from which the fiber optic cable F extends) while using the front end side as a fulcrum, said inclined face portions 63B have the front end of the front tab 36 of the above-mentioned plug connector 3 abutting against them and serve as the above-mentioned fulcrum.

In comparison with the lateral walls 62 and the front end wall 63, the rear end walls 64 are formed to be of greater wall thickness (dimensions in the forward-backward direction X) and, as a result of cutting out an intermediate area in the connector width direction Y, there is formed a pass-through groove 67 that is upwardly open in the direction of mating Z while extending in the forward-backward direction X. This pass-through groove 67 forms a space into which the section comprising the recesses 32A formed in the rear half of the plug connector 3 can be nested from above. Consequently, when the plug connector 3 is in a mated state, the protruding portions 32B located rearward of the recesses 32A of the plug connector 3 are located externally of the receptacle connector 4.

As a result of forming the pass-through groove 67 extending in the wall thickness direction (forward-backward direction X in FIG. 2(A)), the rear end walls 64 remain in a spaced-apart relationship in the connector width direction Y on both sides of the pass-through groove 67. Fastener holding grooves 68, which are produced by recessing the exterior surfaces (interior lateral face, exterior lateral face, and top face) of the rear end walls 64, are formed in each of the opposed rear end walls 64, and fasteners 69 are attached to these fastener holding grooves 68.

The fasteners 69 have substantially horizontal S-shaped cross-sections in a plane perpendicular to the forward-backward direction X (Y-Z plane) and, in the connector width direction Y, have fastening pieces 69A, which are located on the exterior lateral faces of the fastener holding grooves 68, and engagement pieces 69B, which are located on the interior lateral faces of the fastener holding grooves 68. The fastening pieces 69A, which are mated with the exterior lateral faces of the rear end walls 64 from above, have fastening portions 69A-1 solder-attached to circuit board P at the lower end thereof, and the engagement pieces 69B have engagement protrusions 69B-1 that possess resilience in the connector width direction Y and are bent so as to protrude in the same direction. Said engagement protrusions 69B-1 engage with the engagement grooves 32A-1 of the plug connector 3, thereby preventing upward removal of the plug connector 3.

In this manner, as depicted in FIG. 2(B), the plug connector 3 is contained within the receiving recess portion 4A of the receptacle connector 4.

While the description of the plug connector 3 with reference to FIG. 2(A) has focused on the top face and lateral face sides of said plug connector 3, the following discussion will focus on the bottom face side of said plug connector 3 and its interior.

Figure 3:
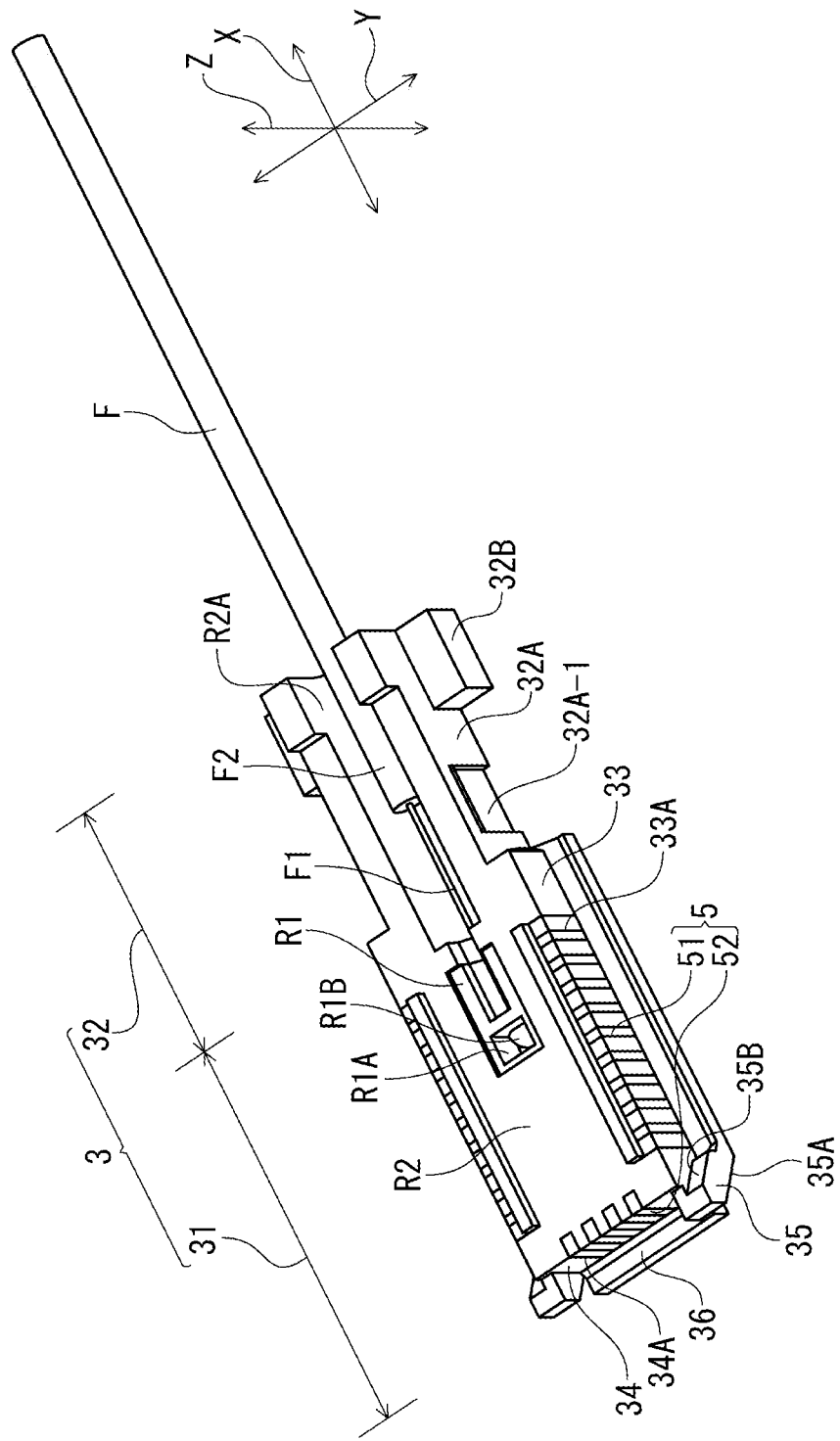
FIG. 3 illustrates a perspective view illustrating the plug connector of FIG. 2(A) in a vertically flipped orientation.
Figure 4A:
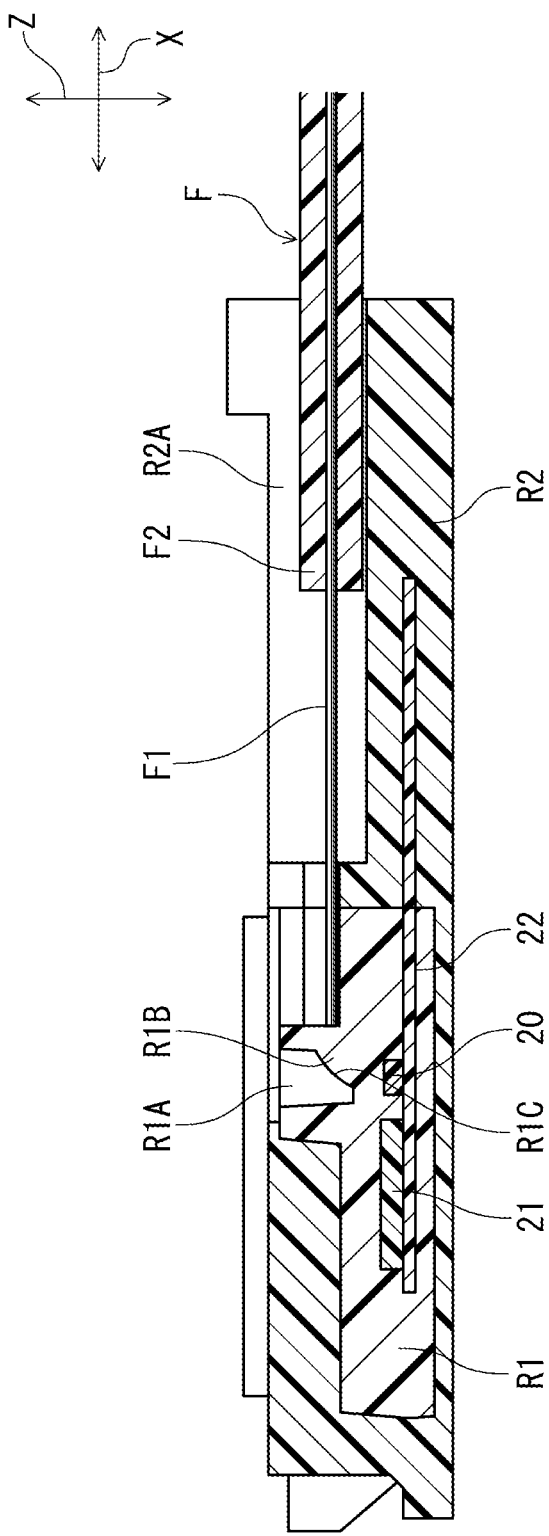
Figure 4B:
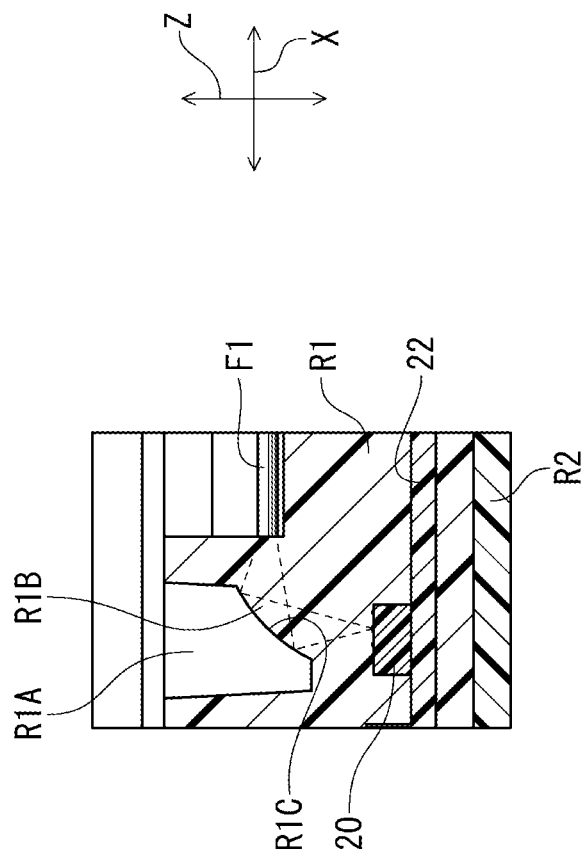

FIG. 3 is a perspective view illustrating the appearance of the bottom face side, in which the plug connector 3 of FIG. 2(A) is shown in a vertically flipped orientation, FIG. 4(A) is a vertical cross-sectional view taken in a plane comprising the axes of the fiber optic cables F (X-Z plane), and FIG. 4(B) is a partial enlarged view thereof.

As can be seen in FIG. 3 and FIG. 4 (A), a fiber optic cable F is connected to the plug connector 3. The fiber optic cable F connected to the plug connector 3 is itself quite well-known and, as can be seen in FIG. 3 and FIG. 4(A), has a fiber optic filament F1 (hereinafter referred to as "filament F1"), which is made by covering a glass core with a glass cladding, and a coating F2 made of resin or the like, which covers said filament F1. As can be seen in FIG. 3 and FIG. 4(A), in the present embodiment, the coating F2 has been removed from the front end portion of the above-mentioned fiber optic cable F and the filament F1 is exposed.

As can be seen in FIG. 4(A) and FIG. 4(B) the plug connector 3 has various elements including a photoelectric conversion element 20, which serves as an optical semiconductor element used to convert optical signals and electrical signals from one to the other, an actuation device 21, which drives the photoelectric conversion element 20, a support member 22, which supports said photoelectric conversion element 20 and the actuation device 21, and multiple lateral terminals 51 and end terminals 52 serving as contact members respectively contacting the lateral terminals 65 and end terminals 66 of the counterpart receptacle connector 4 (see FIG. 1(A) and FIG. 1(B)). All these elements are secured in place by integral molding using a first resin member R1 and a second resin member R2, which will be described below. After molding the first resin member R1, the second resin member R2 is molded on top of it, thereby forming the general configuration of the housing of the plug connector 3. As a result, a front half 31 and a rear half 32 are formed. As can be seen in FIG. 4(A), the first resin member R1 is located substantially within the range of the front half 31, and the second resin member R2, while surrounding said first resin member R1, is also located in the rear half 32.

Figure 5:
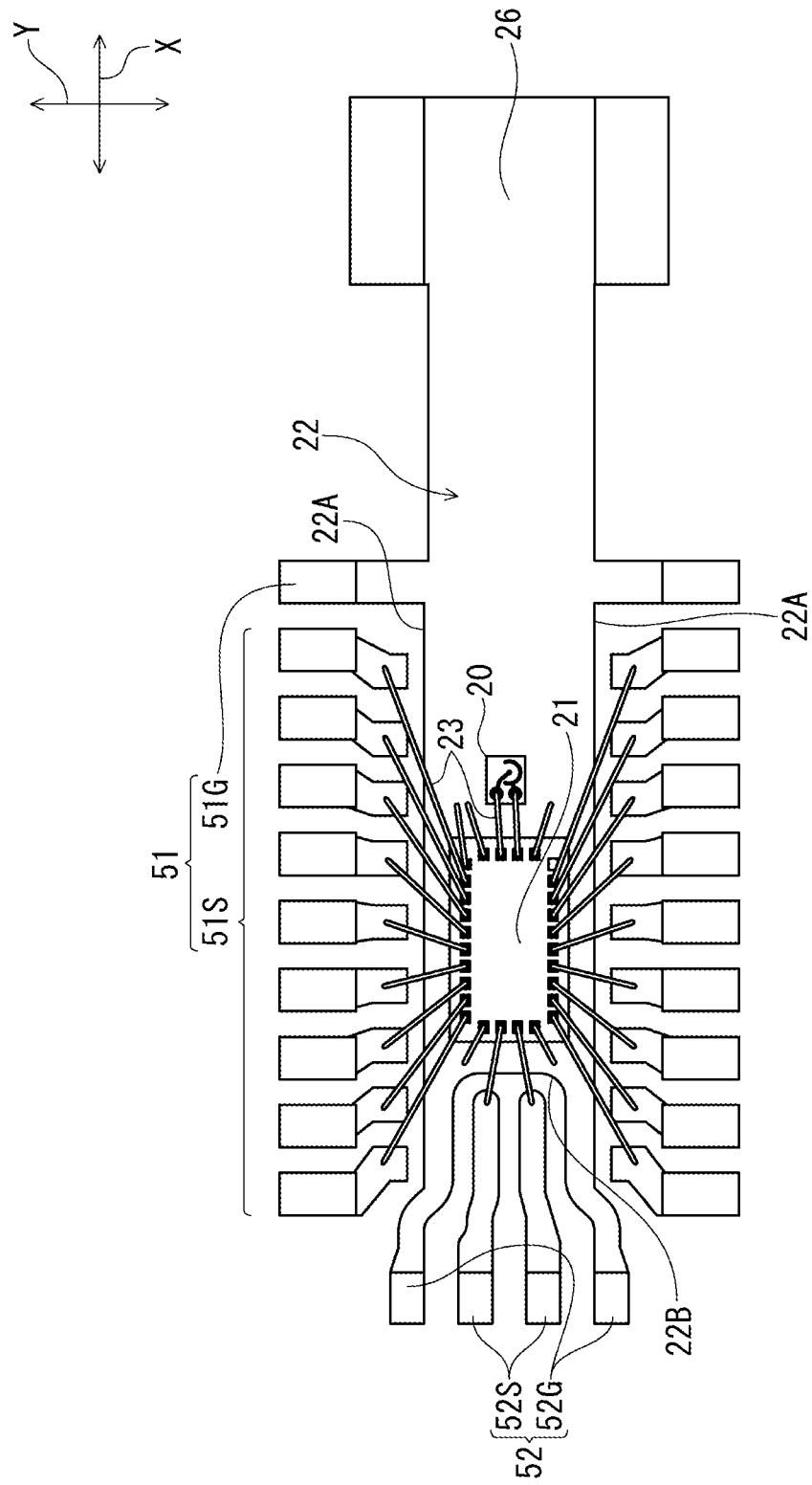
FIG. 5 illustrates a plan view illustrating the positional relationship of the support member of the plug connector and the photoelectric conversion element supported on said support member, the actuation device, as well as the lateral terminals and end terminals.

As can be seen in FIG. 5, which illustrates the positional relationship of the photoelectric conversion element 20, actuation device 21, support member 22 as seen from above, as well as the lateral terminals 51 and end terminals 52, the photoelectric conversion element 20 and the actuation device 21, as well as the actuation device 21 and the lateral terminals 51 and end terminals 52 are interconnected by wires 23 that serve as electrically conductive members. In FIG. 4(A), the photoelectric conversion element 20, actuation device 21, support member 22, lateral terminals 51, end terminals 52, and wires 23 are secured in place by integral molding using the first resin member R1, which is made of transparent resin, and the second resin member R2, which is made of non-translucent resin and is molded integrally with the exterior surface of said first resin member R1. As discussed above, in the present embodiment, said first resin member R1 and second resin member R2 form the housing of the plug connector 3.

The photoelectric conversion element 20 is a surface light-receiving element (e.g., a photodiode (PD)) that converts optical signals to electrical signals in the connector assemblies 1 disposed on circuit board P in FIG. 1. As can be seen in FIG. 4(A) and FIG. 4(B), said photoelectric conversion element 20 is mounted to the hereinafter-described support member 22 while being oriented such that its light-receiving surface is facing upward. The actuation device 21 is a device driving the photoelectric conversion element 20 (e.g., a transimpedance amplifier/limiting amplifier (TIA/LA)). Said actuation device 21, which is mounted to the hereinafter-described support member 22, is located forward of the photoelectric conversion element 20 and is connected to said photoelectric conversion element 20 by wires 23 (see FIG. 5).

In the connector assemblies 1 on circuit board P in FIG. 1(A) and FIG. 1(B), the plug connector 3, as previously discussed, is a connector that converts optical signals to electrical signals and has a light-receiving element serving as a photoelectric conversion element 20. Meanwhile, in the connector assemblies 1 on circuit board Q in FIG. 1(A) and FIG. 1(B), the plug connector 3 is a connector that converts electrical signals to optical signals. In such a plug connector 3 that converts electrical signals to optical signals, an optical semiconductor element such as a surface-emitting light-emitting element (for example, a vertical cavity surface-emitting laser (VCSEL) type light-emitting element) is provided as the photoelectric conversion element 20. In this case, an actuation device used to drive the above-mentioned light-emitting element (for example, a VCSEL driver) is provided as the actuation device 21.

The support member 22 is fabricated by stamping out from a metal plate along with the lateral terminals 51 and end terminals 52. As can be seen in FIG. 5, the lateral terminals 51 and end terminals 52 are arranged along each of the three perimeter edges (i.e., the end and lateral edges) of the front half of the support member 22 (left half in FIG. 5). The lateral terminals 51 include one pair of grounding lateral terminals 51G and nine pairs of signal lateral terminals 51S located along the lateral edges 22A of the support member 22 so as to form pairs of terminals located on the upper and lower lateral edges 22A of the support member 22 illustrated in FIG. 5. The signal lateral terminals 51S are spaced apart from the lateral edges 22A of the support member 22 and the grounding lateral terminals 51G are coupled to the lateral edges 22A of the support member 22. The end terminals 52 include a pair of adjacent signal end terminals 52S, which are arranged along the front end edge 22B of the support member 22 (left edge in FIG. 5), and grounding end terminals 52G located on both sides thereof. The signal end terminals 52S are spaced apart from the front end edge 22B of the support member 22 and the grounding end terminals 52G are coupled to the front end edge 22B of the support member 22. The rear half of the support member 22 (right half in FIG. 5) constitutes a supported portion 26 supported by the hereinafter-described second resin member R2.

In the present embodiment, if the terminals 5 are adapted to handle high-speed signals, both the signal lateral terminals 51S and the signal end terminals 52S can be used as differential terminals. As far as the signal lateral terminals 51S are concerned, a pair of signal lateral terminals 51S opposed in the connector width direction Y are used as a pair of signal-type differential terminals, such that nine pairs of signal-type differential terminals are obtained in the case illustrated in the drawings. Locating the paired signal lateral terminals 51S in each pair symmetrically in the connector width direction Y makes it possible to equalize the interconnection lengths to the actuation device 21 by the wires 23 and form paths for signal transmission under the same conditions, which is more suitable for differential signals. Further, as far as the signal end terminals 52S are concerned, a pair of two adjacent signal end terminals 52S can be used as differential terminals and, in such a case, the interconnections to the actuation device 21 are mutually parallel, thereby making it possible to equalize the lengths of the interconnections and form paths for signal transmission under the same conditions, which is more suitable for differential signals. In other words, excellent signal transmission quality can be ensured by making the strength of coupling between the differential signals flowing through the differential terminals sufficiently large.

In the manufacturing process, although the support member 22, along with the lateral terminals 51 and end terminals 52, is fabricated by stamping out from a metal plate, during the stamping operation, the support member 22, along with the lateral terminals 51 end terminals 52, is obtained as a semi-finished support member (not shown) coupled through the medium of a carrier section (not shown). Specifically, this semi-finished support member has a carrier section (not shown) that encloses the end terminals 52, lateral terminals 51, and support member 22 illustrated in FIG. 5, and the lateral terminals 51 and end terminals 52 are coupled to said carrier section.

Within the bounds of the front half of the support member 22, the actuation device 21 and photoelectric conversion element 20 located on the support member 22, as well as the lateral terminals 51 and end terminals 52 surrounding the support member 22, are molded integrally with the front half of the support member 22 using the first resin member R1 in a state in which the lateral terminals 51 and end terminals 52 are connected to the actuation device 21 on the semi-finished support member by the wires 23, and the actuation device 21 is connected to the photoelectric conversion element 20 by the wires 23. Subsequently, said first resin member R1 is secured in place via integral molding with the supported portion 26 of the support member 22 using the second resin member R2. Said second resin member R2 has a V-shaped retaining groove R2A upwardly open in FIG. 3 (downwardly open and not shown in FIG. 1(A) and FIG. 1(B)) formed throughout the extent of the supported portion 26 and its rearward extent, and the fiber optic cable F is secured in place within this retaining groove R2A with its coating F2.

As shown in FIG. 4(A) and FIG. 4(B), an upwardly open groove portion R1A is formed in the first resin member R1 and an upwardly raised ridge portion R1B is formed within said groove portion R1A. The rear surface of said ridge portion R1B is in a plane perpendicular to the forward-backward direction X, and the front end face of the filament F1 of the fiber optic cable F is in surface contact therewith.

In addition, the front surface of said ridge portion R1B is formed so as to have an exterior surface convexly curved throughout a forwardly and upwardly extending range, and this convexly curved exterior surface, in other words, the concavely curved interior surface, functions as a reflective surface R1C used to change the light path by reflecting optical signals from the fiber optic cable F. As can be seen in FIG. 4(A) and FIG. 4(B), said reflective surface R1C is located above the photoelectric conversion element 20 and, as shown by the light path illustrated in FIG. 4(B) with a dashed line, optical signals propagating forward from the front end face of the filament F1 of the fiber optic cable F through the ridge portion R1B are reflected by the reflective surface R1C such that the optical path is deflected downwardly and the signals are focused on the light-receiving surface (top face) of the photoelectric conversion element 20.

The second resin member R2 made of non-translucent resin has a substantially rectangular parallelepiped-like external configuration and, as can be seen in FIG. 3, etc., reaches the rear half 32 located rearward of the first resin member R1. The contact portions of both the signal lateral terminals 51S and the grounding lateral terminals 51G of lateral terminals 51 are exposed on the exterior lateral faces that extend in the forward-backward direction X (exterior lateral faces of the lateral edge portions 33). In addition, the contact portions of both the signal end terminals 52S and the grounding end terminals 52G of the end terminals 52 are exposed on the front end face that extends in the connector width direction Y (front end face of the front end edge portion 34).

The procedure for matingly connecting the thus-configured plug connector 3 to the receptacle connector 4 will be discussed next.

Figure 6A:
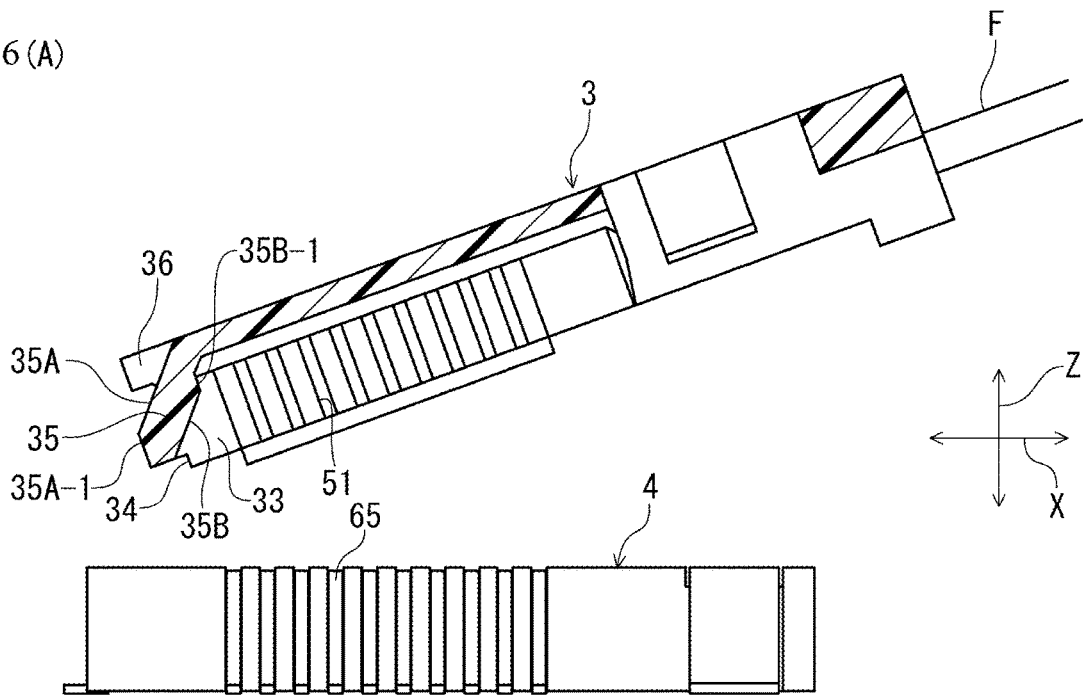
Figure 6B:
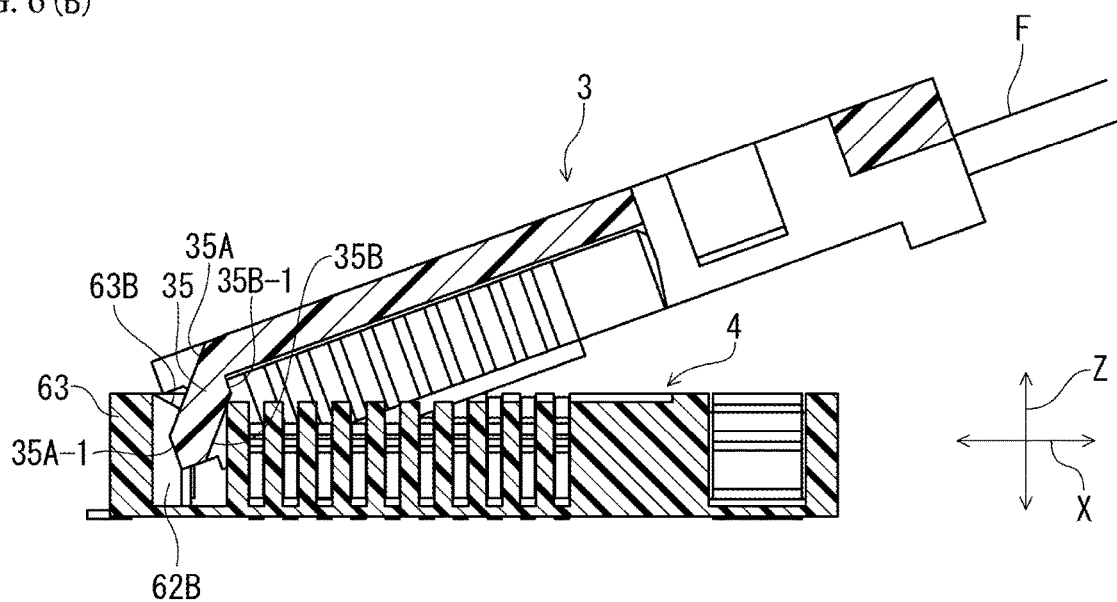

Although the plug connector 3 is mated with the receptacle connector 4 from above in an orientation parallel to the receptacle connector 4, in many cases, such a parallel orientation is not used, and, as can be seen in FIG. 6(A) and FIG. 6(B), the front end side of the plug connector 3 (left-hand side in FIG. 6(A) and FIG. 6(B)) may sometimes be nested into the receptacle connector 4 first in an orientation in which this front end side is tilted downward, whereupon the rear end side may be lowered and mating finally completed in the above-mentioned parallel orientation. If mating is performed in accordance with such a procedure, the advantage is that positioning is made easier because the front end side is first nested locally.

First, as can be seen in FIG. 6(A), the plug connector 3 is placed in a location above the receptacle connector 4 and oriented such that the front end portion is tilted downward. In other words, it is oriented such that the rear end side from which the fiber optic cable F extends is tilted upward.

Next, with its front end portion still tilted downward, the plug connector 3 is lowered and the front end portion is first nested into the receptacle connector 4. The front end portion has formed therein inclined protrusions 35, and said inclined protrusions 35, as discussed above, protrude both from the exterior lateral faces 33 and the front end face 34 of the plug connector 3 (see FIG. 2(A)). As depicted in FIG. 6(A), in comparison with the orientation in which the fiber optic cable F connected to the plug connector 3 extends horizontally (non-inclined orientation illustrated in FIG. 2(A)), in the orientation (inclined orientation) in which the front end portion of the plug connector 3 is tilted downward, the inclined protrusions 35 assume an orientation in which the surfaces of the inclined top faces 35A and the inclined bottom faces 35B of the inclined protrusions 35, when viewed in the connector width direction Y, become closer to the up-down direction (mating direction Z), which is more suitable for nesting into the receptacle connector 4. Therefore, as depicted in FIG. 6(B), when the plug connector 3 is lowered, the inclined protrusions 35 are guided into the lead-in recesses 62B of the receptacle connector 4 and, as a result, the plug connector 3 is placed in a position for mating with the receptacle connector 4 both in the forward-backward direction X and in the connector width direction Y.

In this state, by lowering the rear end side of the plug connector 3, that is, the side from which the fiber optic cable F extends, and rotating it clockwise about the front end portion of the plug connector 3, mating with the receptacle connector 4 is increased and completed at a predetermined depth extending throughout the entire length of the plug connector 3.

Figure 7:
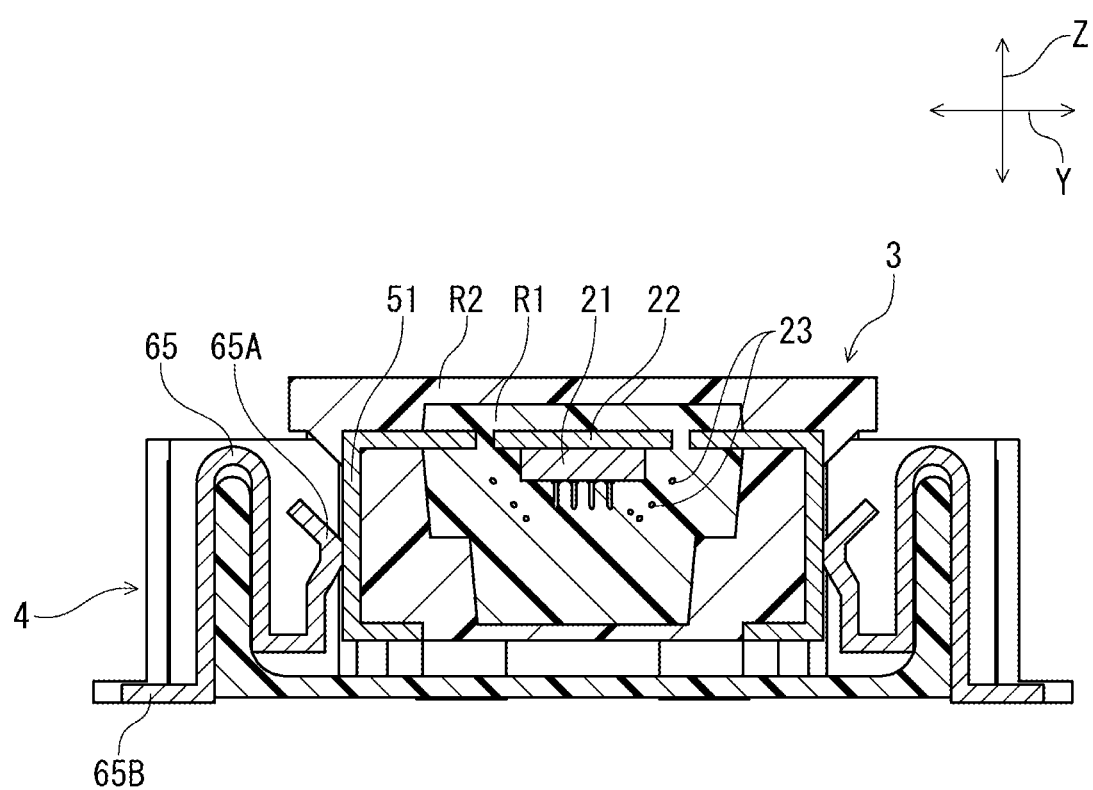
FIG. 7 illustrates a vertical cross-sectional view taken in a plane extending in the connector width direction at the location of the lateral terminals in a state in which the plug connector has been mated with the receptacle connector.

In the process of rotation about the front end portion of the plug connector 3 from the start of nesting of the inclined protrusions 35 into the lead-in recesses 62B until completion of mating of the plug connector 3 with the receptacle connector 4, the lateral terminals 51 of the plug connector 3 are in sliding contact with the resilient contact portions 65A of the lateral terminals 65 of the receptacle connector 4 while maintaining contact pressure against said contact portions 65A. At such time, the lateral terminals 51 make sliding contact with the lateral terminals 65 substantially in the direction of mating Z and make almost no sliding contact therewith in the forward-backward direction X. Consequently, there is no scratching between the lateral edges of the lateral terminals 51 of the plug connector 3 and the lateral terminals 65 of the receptacle connector 4, and, as a result, the two connectors are mated smoothly and easily, and the paired terminals are brought into contact as shown in FIG. 7. In addition, since in the process of the above-described rotation the end terminals 52 of the plug connector 3 and the end terminals 66 of the receptacle connector 4 are brought into contact while their surfaces approach one another, no sliding contact takes place.

Figure 8A:
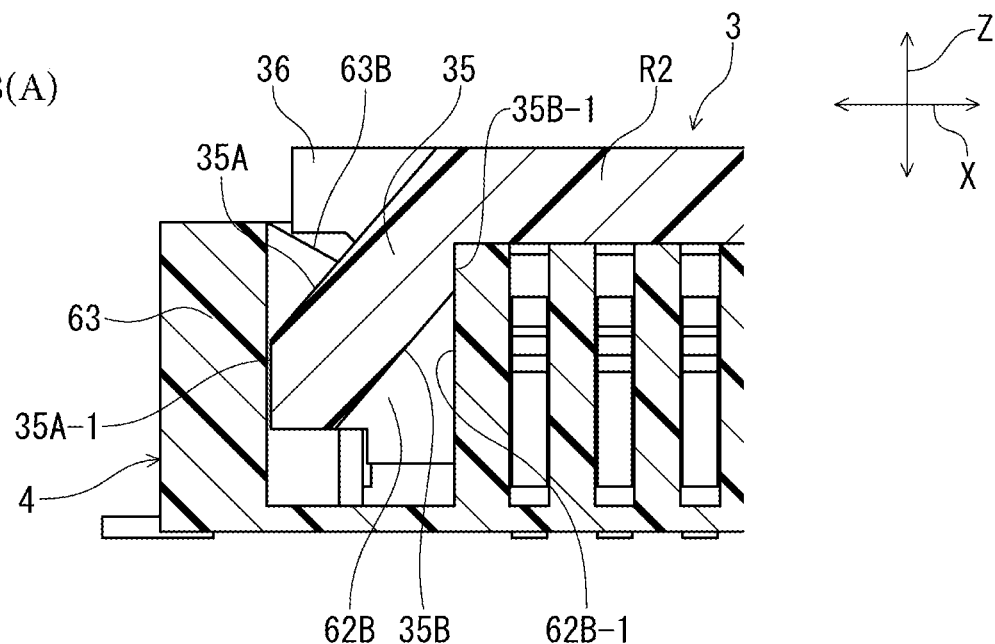

As can be seen in FIG. 8(A), once the mating of plug connector 3 to the predetermined depth is complete, the inclined protrusions 35 of the plug connector 3 assume an inclined orientation in the lead-in recesses 62B of the receptacle connector 4. As a result, the inclined protrusions 35 have their front restricted portions 35A-1 placed in a face-to-face relationship with the front interior surfaces of the lead-in recesses 62B and their rear restricted portions 35B-1 in a face-to-face relationship with the restricting portions 62B-1 formed on the rear interior surface of the lead-in recesses 62B, thereby restricting the position of the plug connector 3 in the forward-backward direction X.

Figure 8B:
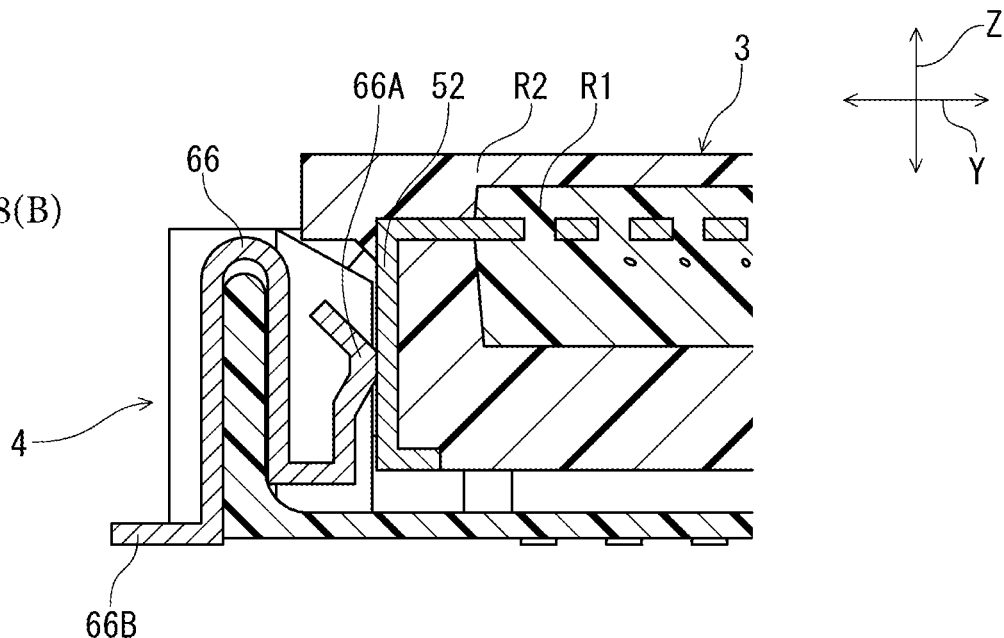

As can be seen in FIG. 8(A), the maximum dimension of the inclined protrusions 35 in the forward-backward direction X (distance between the restricted portions 35A-1 and the restricted portions 35B-1) is slightly smaller than the dimensions of the lead-in recesses 62B in the forward-backward direction X. In other words, there is some clearance (spacing) between the restricted portions 35A-1, 35B-1 and the lead-in recesses 62B in the forward-backward direction X. Since in the present embodiment, as can be seen in FIG. 8(B), the resilient contact portions 66A of the end terminals 66 of the receptacle connector 4 abut the end terminals 52 of the plug connector 3 from the front, the plug connector 3 is subject to a constant biasing force directed rearwardly from said contact portions 66A. As a result, as can be seen in FIG. 8(A), a state is maintained in which the rear restricted portions 35B-1 of the inclined protrusions 35 abut the restricting portions 62B-1 formed on the rear interior surface of the lead-in recesses 62B. Therefore, even if a random rearwardly directed pulling force should act on the fiber optic cable F in the mated state of the connectors, the lateral terminals 51 of the plug connector 3 and the lateral terminals 65 of the receptacle connector 4 will maintain a state of contact in a stable relative position and generation of frictional forces in the forward-backward direction due to the above-mentioned clearance will be adequately suppressed.

The procedure used for removing the plug connector 3 from the receptacle connector 4 will be discussed below. In order to remove the plug connector 3 from the receptacle connector 4, the rear end side of the plug connector 3, i.e., the side from which the fiber optic cable F extends, is raised and the plug connector 3 is tilted. At such time, the front tab 36 located on the front end side of the plug connector 3 abuts the inclined face portions 63B formed on the interior top face of the front end wall 63 of the receptacle connector 4 and the plug connector 3 rotates using the points of abutment between the front tab 36 and the inclined face portions 63B as fulcra such that the tilt of said plug connector 3 is readily increased and its removal becomes possible, as depicted in FIG. 6(B). Since the inclined protrusions 35 of the plug connector 3 remain within the lead-in recesses 62B of the receptacle connector 4 in the process of rotation of the plug connector 3, the plug connector 3 can be reliably rotated while preventing the front tab 36 from being rearwardly detached from the inclined face portions 63B.

Figure 9:
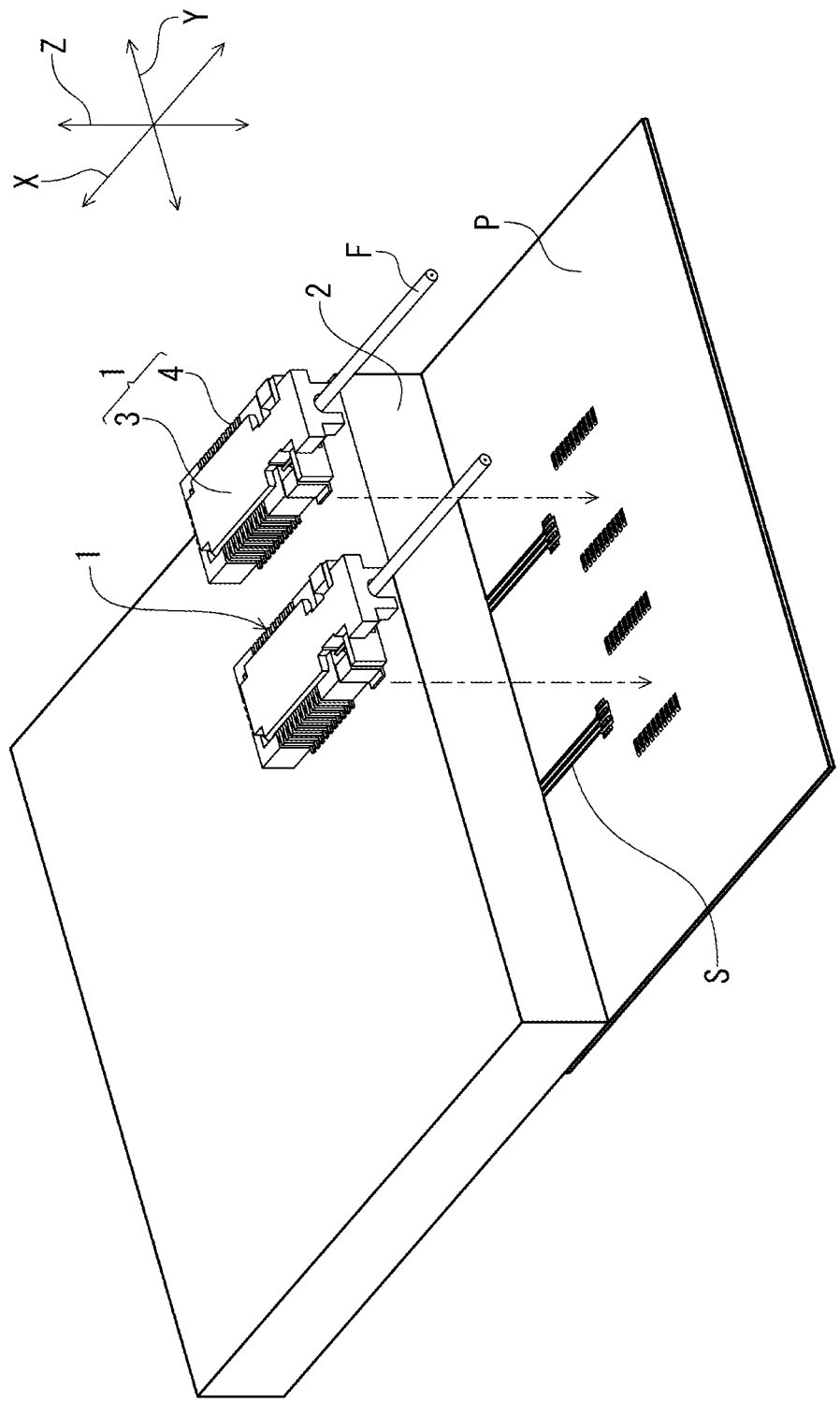
FIG. 9 illustrates a perspective view illustrating an example in which multiple connector assemblies are disposed on a circuit board.
Figure 10:
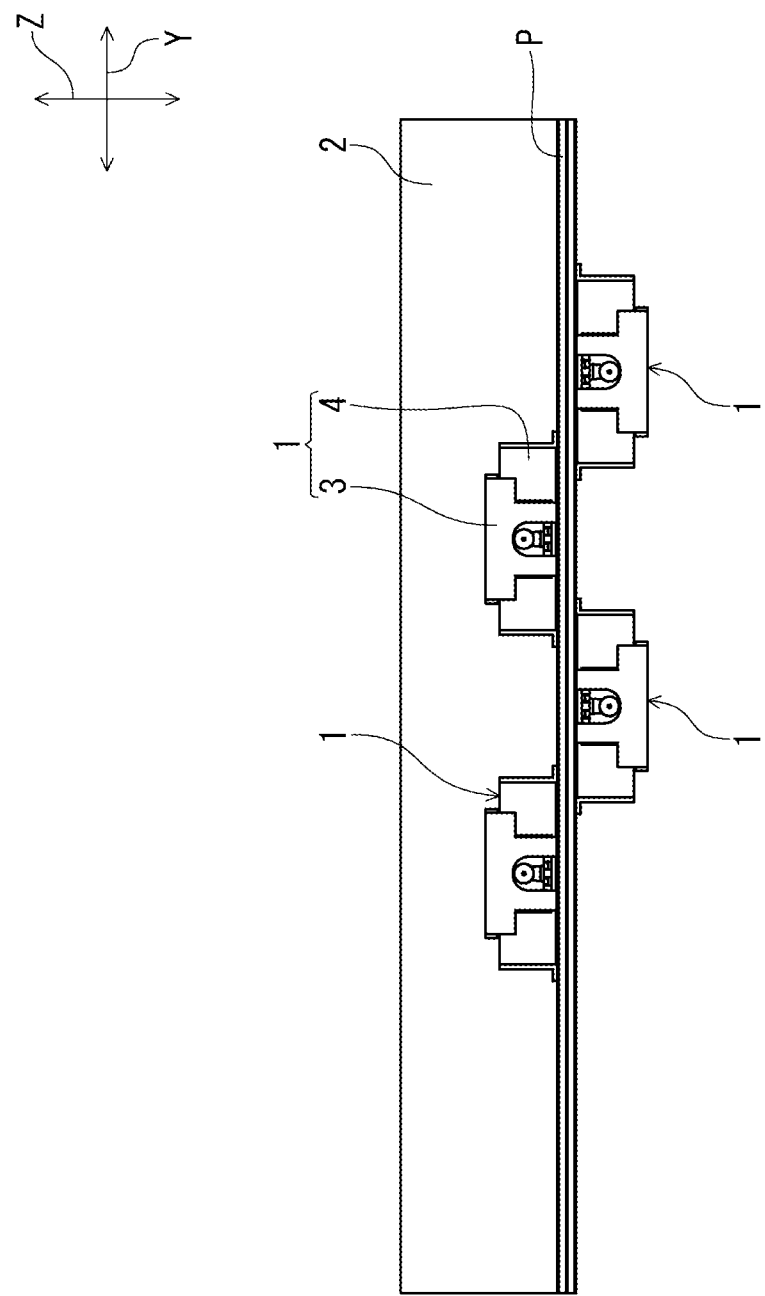
FIG. 10 illustrates a front elevation view illustrating the placement of the connector assemblies of FIG. 9.

As can be seen in FIG. 9 and FIG. 10, multiple connector assemblies 1 of the present embodiment provided with a plug connector 3 and a receptacle connector 4 can be disposed both on the top and bottom faces of circuit board P (and furthermore, on circuit board Q). In the present embodiment, as can be seen in FIG. 10, the connector assemblies 1 are disposed in locations that are mutually offset in the connector width direction Y on the top and bottom sides of circuit board P; when viewed in the forward-backward direction X, they are disposed in a staggered manner. Along with making efficient use of both faces of circuit board P and allowing for each connector assembly 1 to be disposed in appropriate locations suitable for routing to the processor 2, etc., such placement allows for an arbitrary number of multiple connector assemblies 1 to be placed in a compact manner.

In addition, disposing the connector assemblies 1 in a staggered manner as described above makes it possible, for example, to form vias used to connect the processor 2 and the connector assemblies 1 disposed on the bottom face of circuit board P (not shown) so as to extend from the bottom face to the top face of circuit board P. As a result, for all the connector assemblies 1 disposed on circuit board P, it is sufficient to form circuitry used for connection to the processor 2 only on the top face of circuit board P, which facilitates the design of said circuitry.

Although in the present embodiment there are two connector assemblies 1 disposed on the surface of each of the top and bottom faces of circuit board P, as an alternative, the effect of facilitating the design of the above-described circuitry is obtained if, along with disposing multiple connector assemblies on the surface of one of the top and bottom faces, at least one connector assembly is disposed on the other face, and the connector assemblies on the top and bottom faces, when viewed in the forward-backward direction X, are disposed in a staggered manner.

Since in the present embodiment a single fiber optic cable F is connected to the plug connector 3 and a single connector assembly 1 is formed after mating with the receptacle connector 4, even if multiple single connector assemblies 1 are disposed on each of the top and bottom faces of circuit board P in the electronic device, changes in the number of, and the choice of placement locations for said single connector assemblies 1 are done freely, which allows for an optimal design adaptable to various electronic devices.

As a result of imparting resilient member functionality only to the end terminals 66 of the receptacle connector 4 among the end terminals 52 of the plug connector 3 and the end terminals 66 of the receptacle connector 4, a rearwardly directed biasing force is caused to act on the plug connector 3. However, embodiments involving said biasing force are not limited thereto, and a rearwardly directed biasing force may be caused to act on the plug connector by imparting resilient member functionality only to the end terminals of the plug connector or, alternatively, to the end terminals of both the plug connector and the receptacle connector.

Although in the present embodiment the connector assemblies 1 are disposed on the top and bottom faces in each of circuit board P and circuit board Q, placing connector assemblies on both faces of the circuit boards is not essential and connector assemblies may be disposed, for example, only on the surface of either the top face or the bottom face.

Figure 11A:
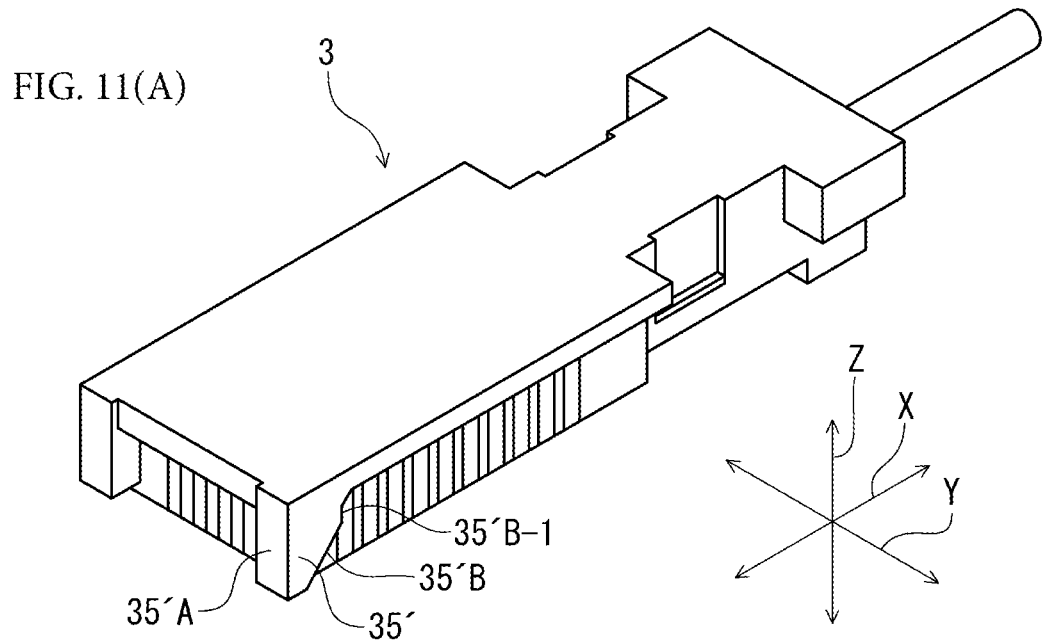
FIGS. 11(A) and 11(B) illustrate perspective views of a variation of the present invention prior to the mating of the plug connector and the receptacle connector.
Figure 11B:
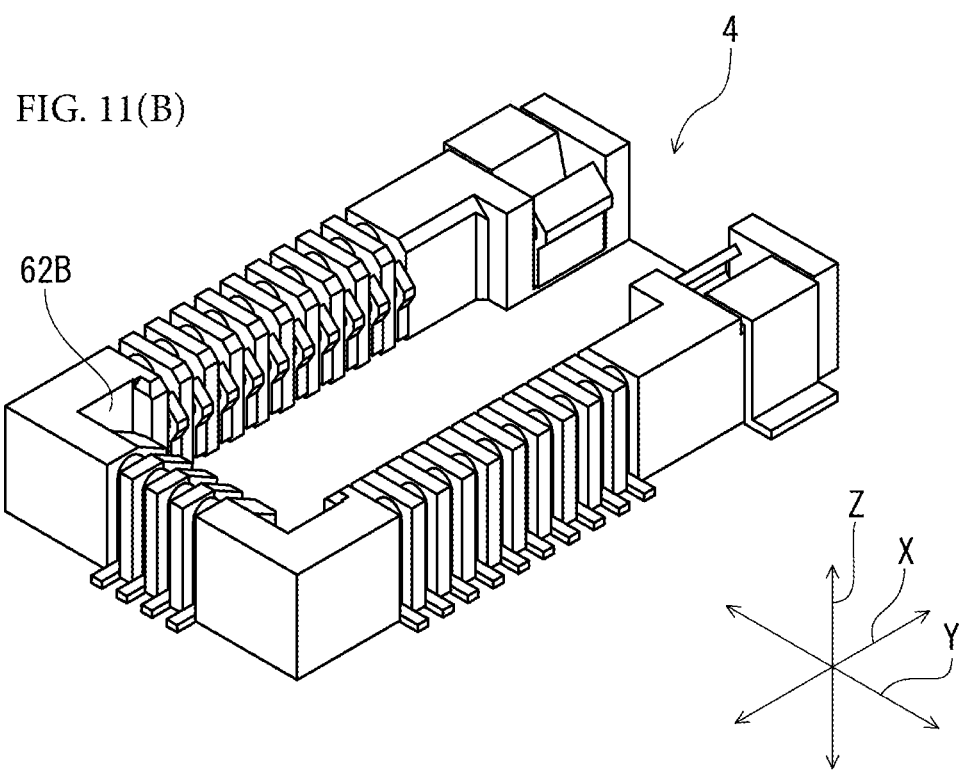
Figure 12A:
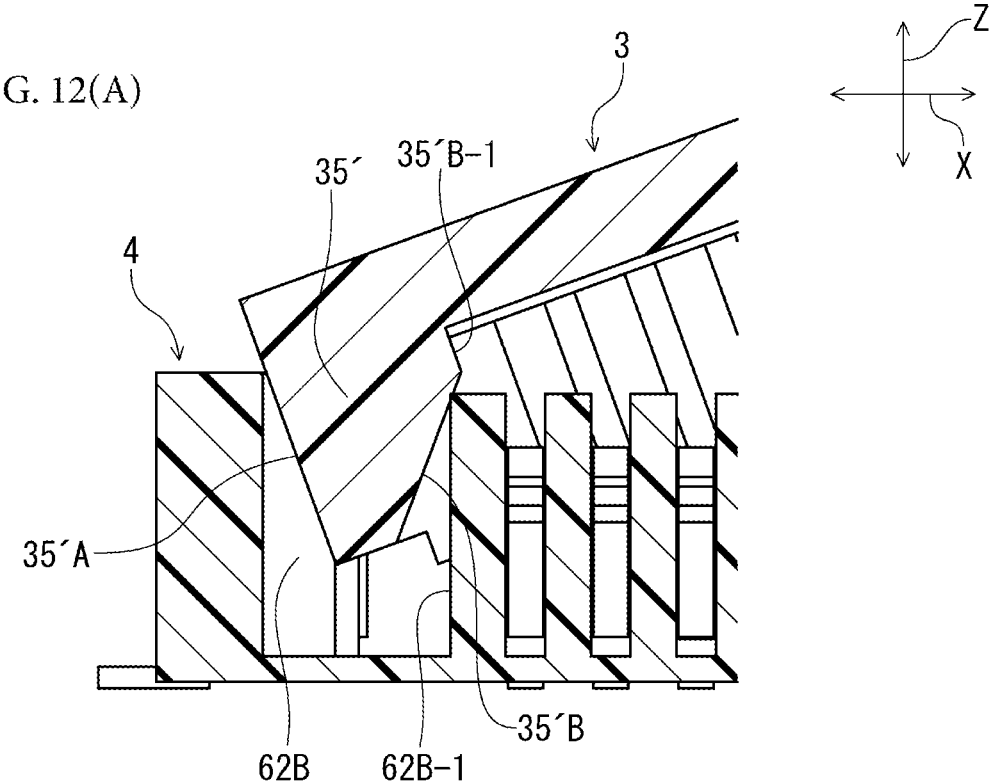
FIG. 12(A) is a cross-sectional view taken at the start of mating, in which only the front end portion of the plug connector has been fitted into the receptacle connector.
Figure 12B:
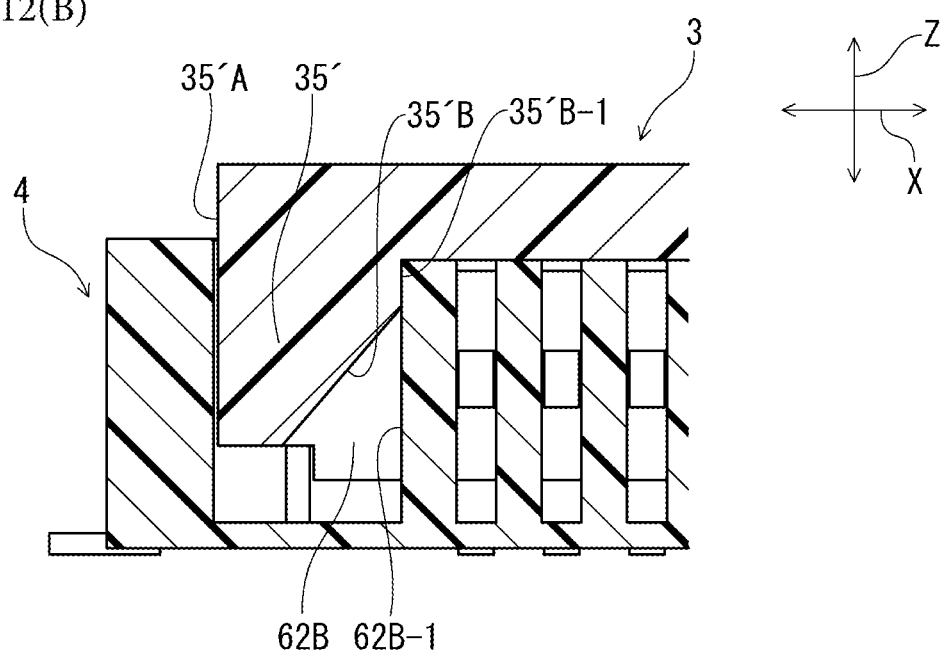
FIG. 12(B) is a cross-sectional view taken in a mated state.

The present invention is not limited to the embodiment described with reference to FIGS. 1 to 10 and a number of variations are possible. For example, the inclined top faces 35A and inclined bottom faces 35B of the inclined protrusions 35 formed in the front half 31 of the plug connector 3 do not have to be in substantially parallel planes and inclined with respect to the forward-backward direction X and the mating direction Z as shown in FIGS. 6(A) and 6(B), and it is sufficient for only the inclined bottom faces 35'B to be inclined in the inclined protrusions 35', as depicted in FIG. 11(A) and FIGS. 12(A) and 12(B). In the embodiment depicted in FIG. 11(A) and FIGS. 12(A) and 12(B), only the inclined bottom faces 35'B are inclined faces similar to those of FIGS. 6(A) and 6(B), and the faces opposed thereto are not inclined and form front end faces 35'A that are perpendicular to the forward-backward direction X. In the upper section of the above-mentioned inclined bottom faces 35'B, there are formed restricted portions 35'B-1 that are similar to those of FIGS. 6(A) and 6(B). As can be seen in FIG. 12(A), when the plug connector 3 is mated with the receptacle connector 4, in the same manner as in FIG. 6(B), the front end portion of the plug connector 3 is tilted downwardly and the inclined bottom faces 35'B of the inclined protrusions 35' are placed in a nearly parallel orientation face-to-face with the restricting portions 62B-1 forming the rear interior surfaces of the lead-in recesses 62B of the receptacle connector 4 and readily enter said lead-in recesses 62B. After mating of the plug connector 3 with the receptacle connector 4, the restricted portions 35'B-1 are placed in a face-to-face relationship with the restricting portions 62B-1 of the above-mentioned lead-in recesses 62B, thereby restricting the position of the plug connector 3 in the forward-backward direction X.

The advantage of such an embodiment is that the thickness between the front end face 35'A and the inclined bottom face 35'B of the above-mentioned inclined protrusions 35' in the forward-backward direction X becomes larger than that of the inclined protrusions 35 of FIGS. 6(A) and 6(B) and the strength of said inclined protrusions 35' is improved.

DESCRIPTION OF THE REFERENCE NUMERALS

1 Connector assembly
3 Plug connector
4 Receptacle connector
20 Photoelectric conversion element
21 Actuation device
33 Lateral edge portion
34 Front end edge portion
35B-1, 35'B-1 Restricted portions
51 Lateral terminals
52 End terminals
62B-1 Restricting portion
65 Lateral terminals
66 End terminals (resilient members)
F Fiber optic cable
X Forward-backward direction

What is claimed is:

1. A connector assembly arrangement comprising:
connector assemblies disposed on a first face and a second face of a circuit board in an electronic device,
wherein the connector assemblies, along with having a plug connector comprising a photoelectric conversion element configured to convert optical signals to electrical signals, and electrical signals to optical signals, and a receptacle connector with which said plug connector is mated, have the plug connector and the receptacle connector electrically connected through mutual contact between terminals,
wherein the plug connector, from which a fiber optic cable is configured to facilitate optical signal transmission, and is connected to the element extends in one direction from said plug connector, also has terminals connected to the photoelectric conversion element,
wherein the fiber optic cable is a single fiber optic cable,
wherein a plurality of the connector assemblies are disposed on the first face of the circuit board,
wherein the terminals of the plug connector are arranged laterally on an end face side of the connector assembly arrangement opposite to the fiber optic cable and are electrically connected through mutual contact between terminals by board-mounting, and
wherein the terminals of the plug connector are further arranged on lateral sides of the connector assembly arrangement disposed on opposing sides of a direction that the fiber optic cable longitudinally extends toward the end face side of the connector assembly arrangement.

2. The connector assembly arrangement according to claim 1, wherein the plurality of the connector assemblies are disposed on the first face of the circuit board and one or more other ones of the connector assemblies are disposed on the second face.

3. The connector assembly arrangement according to claim 2, wherein the connector assemblies are disposed on the first face of the circuit board and on the second face thereof in a staggered manner when viewed in a direction in which the fiber optic cable protrudes.

* * * * *